United States Patent
Illsley et al.

(10) Patent No.: US 7,356,489 B2
(45) Date of Patent: Apr. 8, 2008

(54) SYSTEM AND METHOD FOR VIRTUALLY MATCHING OR COMPARING PREVIOUSLY WORN CLOTHING WITH CURRENTLY WORN CLOTHING

(75) Inventors: Martin Illsley, Magagnosc (FR); Jonathan Kaldor, Grasse (FR); David Berglund, Villeneuve Loubet (FR)

(73) Assignee: Accenture Global Services GmbH, Schaffhausen (CH)

( * ) Notice: Subject to any disclaimer, the term of this patent is extended or adjusted under 35 U.S.C. 154(b) by 336 days.

(21) Appl. No.: 10/457,949

(22) Filed: Jun. 9, 2003

(65) Prior Publication Data

US 2004/0078301 A1 Apr. 22, 2004

(30) Foreign Application Priority Data

Jun. 10, 2002 (EP) .................................. 02354094

(51) Int. Cl.
*G06Q 30/00* (2006.01)
(52) U.S. Cl. ....................................................... 705/26
(58) Field of Classification Search .................. 705/26, 705/27
See application file for complete search history.

(56) References Cited

U.S. PATENT DOCUMENTS

| | | | |
|---|---|---|---|
| 5,551,021 A * | 8/1996 | Harada et al. ............ 707/104.1 |
| 5,930,769 A * | 7/1999 | Rose ............................ 705/27 |
| 2002/0045959 A1 | 4/2002 | Van Overveld | |
| 2002/0178061 A1* | 11/2002 | Lam ............................ 705/14 |
| 2003/0101105 A1* | 5/2003 | Vock ............................ 705/27 |
| 2003/0110099 A1* | 6/2003 | Trajkovic et al. ............. 705/27 |
| 2005/0027612 A1* | 2/2005 | Walker et al. ................ 705/26 |

FOREIGN PATENT DOCUMENTS

| | | |
|---|---|---|
| DE | 100 31965 A1 | 1/2002 |
| EP | 0 636 993 A1 | 2/1995 |
| WO | WO 01/45029 A2 | 6/2001 |

OTHER PUBLICATIONS

My Virtual Model (tm) Dressing Debuts on MSN, Apr. 24, 2002, Canda NewsWire, Ottawa, pp. 1-3.*

* cited by examiner

*Primary Examiner*—Jeffrey A. Smith
*Assistant Examiner*—Jason B. Dunham
(74) *Attorney, Agent, or Firm*—Brinks Hofer Gilson & Lione

(57) ABSTRACT

The present invention relates to a system for reproducing a preceding picture of a user wearing clothes or analog, comprising: a screen (4) to display at least a pre-registered picture of the user; a clothes type detector (8) to automatically identify the kind of clothes currently worn by the user; and a search unit (14) to extract automatically, from at least one central remote database (13), at least one pre-registered picture in which the user wears at least one article of clothing similar to or matchable with the current one.

13 Claims, 2 Drawing Sheets ately, a trying-on cubicle or room is provided with not only a mirror to reflect the current picture of an user wearing clothes, but also a screen to display a preceding picture such # SYSTEM AND METHOD FOR VIRTUALLY MATCHING OR COMPARING PREVIOUSLY WORN CLOTHING WITH CURRENTLY WORN CLOTHING This application claims the priority benefit of European Patent Application Serial No. 02354094.1, filed Jun. 10, 2002, titled "INTERACTIVE TRYING-ON CUBICLE."

FIELD OF THE INVENTION

The present invention relates to trying-on cubicles or rooms which are usually provided in clothes shops or analog.

BACKGROUND

As shoppers go from one chancing room or trying-on cubicle of a shop to another, they have little way of remembering what they looked like in the clothes that they tried on in the first shop. Further, a shopper may try a first article of clothing in a first shop (for example a shirt or trousers), and another one in a second shop (for example a jacket), and may want matching these clothes.

There is a technical problem in giving the possibility for a shopper to compare or match some clothes that he tries in a current shop with respect to other clothes that he tried in a former one.

There is another technical problem in selecting, among an important number of pictures taken in a trying-on cubicle and representing the same shopper, some pictures to be compared with clothes of the same type tried by the shopper in another shop or to allow the shopper to match different types of clothes tried in different shops. Indeed, when trying clothes in a shop, a shopper usually wears several clothes and only some of these are to be compared with other clothes tried in another shop.

A purpose of the present invention is to provide a changing or trying-on cubicle or room giving a shopper the possibility to see what he looked like when trying on a former article of clothing and/or to compare or match at least one article of clothing he wore in a former shop.

Another purpose of the invention is to provide an automatic selection of pictures in which a shopper wears the same kind of clothes.

Another purpose of the invention is to provide a trying-on room or cubicle adapted to communicate with at least a central system in order to give to a shopper the possibility of comparing clothes of different shops.

BRIEF SUMMARY OF INVENTION

To attain the above purposes and others, the present invention provides a system for producing at least one picture of a person wearing clothes. Such a system comprises a screen to display at least one pre-registered picture a mirror to reflect the current appearance of the user; a detector to identify the kind of clothes worn by the user; and a search unit to extract from a central remote database the pre-registered picture in which the user wore similar or matchable kind of clothes.

A trying-on room according to the invention is provided with a camera or the like to take preferably fixed pictures to be displayed in other locations. According to the invention, a trying-on cubicle or room is provided with not only a mirror to reflect the current picture of an user wearing clothes, but also a screen to display a preceding picture such a picture is preferably taken in another location, i.e. in another trying-on cubicle, for example of another shop. However, the system of the present invention also works for a shopper trying on successively or not different clothes in a same shop (in a same trying-on room or not).

According to a preferred embodiment, the changing room comprises a detector to identify at least the type of clothes worn by the user. For example, such a detector can be a magnetic detector of transponder or any other kind of tag providing a wireless identification of the clothes.

The user may select between a comparison of clothes of the same kind or a matching of clothes to be wore together based, for example, on their color or kind. The system is then able to select among all the pictures of the user taken previously, a limited number of pictures corresponding to the choice of that user.

A communication between the trying-on rooms and the central system comprising the database in which are stored the pictures can be a wireless link or a wired link.

DESCRIPTION OF THE DRAWINGS

These purposes, features, and advantages of preferred, non limiting, embodiments of the present invention will be described by way of examples with reference to the accompanying drawings, in which.

Figure 1:
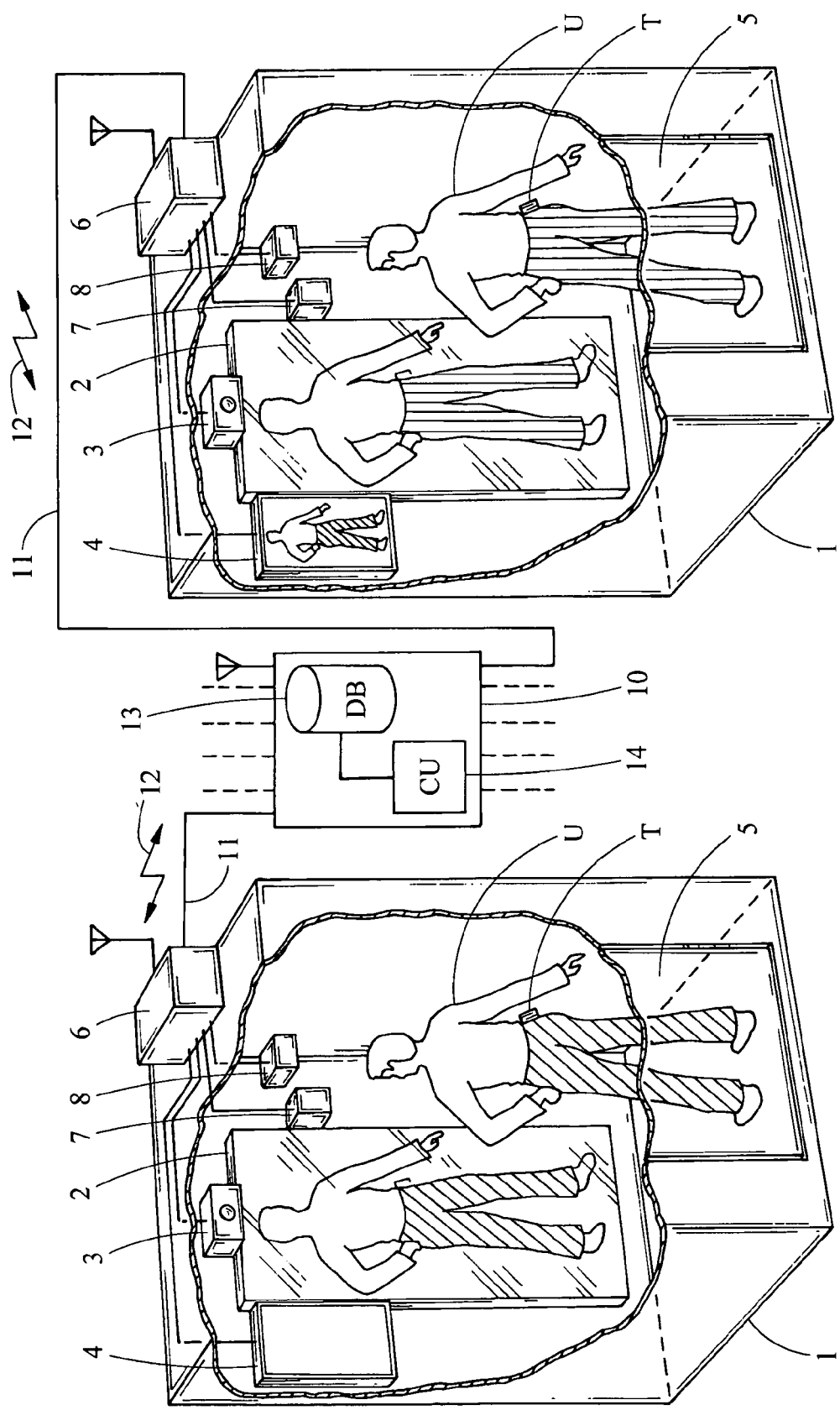
FIG. 1 schematically represents trying-on rooms and the main elements of a central system according to one exemplary embodiment of the present invention.

For clarity, only the elements useful to the understanding of the invention have been shove in the drawings and will be disclosed hereafter. More specifically, the programming steps for implementing the invention will not be detailed as it will readily occur to those skilled in the art.

DESCRIPTION OF THE PREFERRED EMBODIMENTS

FIG. 1 schematically represents a system according to one exemplary embodiment of the present invention. In FIG. 1, two trying-on rooms, or cubicles 1 have been shown. However, according to the invention, the number of trying-on rooms is not limited.

According to the invention, each room 1 is provided with a mirror 2 (which equips most of the conventional trying-on rooms) The mirror 2 is associated with a camera 3 to take a picture of a user looking in the mirror: and wearing clothes. Alternatively, the mirror may be replaced with a screen in which are displayed the current picture taken by the camera 3. In this embodiment, the camera is able to take moving pictures.

According to the invention, each room 1 also comprises at least one screen 4 to display picture s) of the current user taken in a previous trying-on room. Screen 4 may be separated from the mirror or screen 2, or be combined therewith. Rooms 1 are closable with a door or curtain 5.

Trying-on rooms according to the present invention are also provided with a control unit 6. Control unit 6 is preferably a computerized device for controlling the camera 3, the screen 4 and all the devices and elements that also comprise the system. An input device 7 such as a card reader (for loyalty cards or more generally any kind of identification cards), or a keyboard or analog, is provided so that the user can select some functionality of the system and for authentication.

Further, the system also comprises a detector 8 (preferably a wireless detector) able to identify the kind of clothes worn by the user.

According to a preferred embodiment of the present invention, the detector 8 is an electromagnetic transponder reader which is able to detect a tag or any analog passive or active label fixed to an article of clothing. Thus, one takes benefit of the fact that the clothes in a shop are most often equipped with electromagnetic labels or tags which can be used by the present invention to identify at least the kind of clothes. Tags may contain the type of clothes, its color, pattern, etc. The kind of product automatically detected by the system is used either to select pictures showing the user wearing clothes of the same type, or to select pictures in which the user wears clothes which may be matched with the current one.

Each trying-on room according to the present invention communicates with a, central system 10 through wired 11 or wireless 12 links. The central system according to the invention includes at least a database 13 (DB) for storing the pictures taken in the different changing roams. Indeed, once the user has tried an article of clothing; in a first changing room, the system cannot know where a user will try another article of clothing to be compared with the previous one. The system 10 also comprises a central control unit 14 (CU) for controlling and synchronizing all the operation of the system. Alternatively, more than one database and more than one central system can be used. These systems then share the information.

A user U wearing clothes is represented in FIG. 1 with a silhouette in dotted lines. In a first trying-on room 1 (upper in the figure), the user U is wearing trousers with horizontal stripes In the other trying-on room 1 (lower in the figure), the user U is wearing trousers with vertical stripes.

Figure 2:
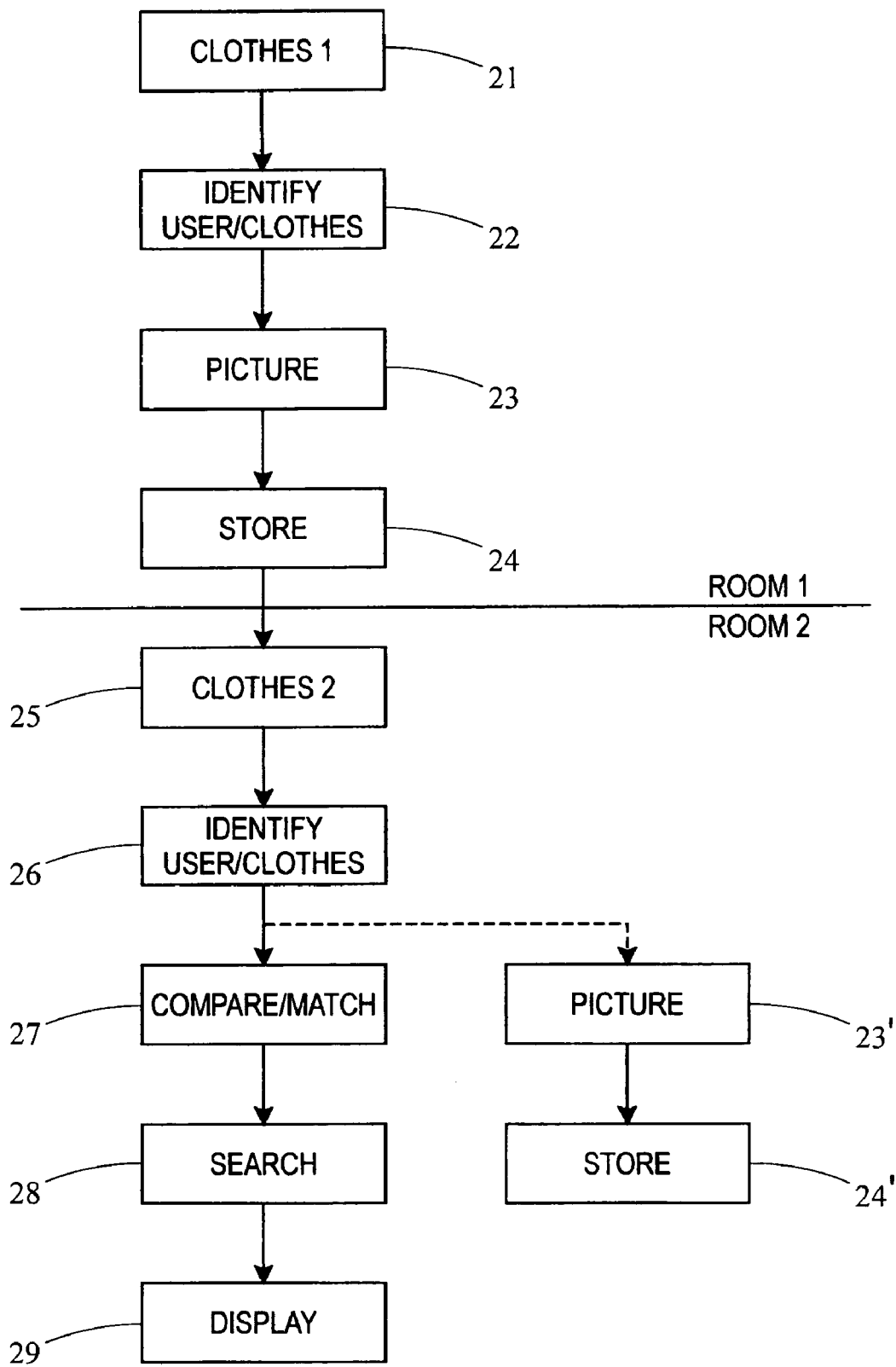
FIG. 2 illustrates, with a flowchart, the main steps of an exemplary Implementation of the present invention.

The operation of a system according to the present invention will be described hereafter in connection with FIG. 2, which illustrates, by way of a flowchart, an exemplary implementation of the invention.

Let us assume that, in a trying-on room according to the present invention, a user wears the clothes he chooses in a current shop, for example trousers with horizontal stripes (CLOTHES1, block 21) as shown in FIG. 1 (in the upper changing room).

If the user plans to compare or match the current article of clothing with another one, he enters an authentifiant in the system. The authentication of the user can be made through a keyboard in which the user enters a specific code or through a loyalty card or smart card containing, for example, in a chip or on a magnetic track, the identification of the user. The system not only identities the user but also the clothes that he wears (block 22, IDENTIFY USER/CLOTHES). The identification of the article of clothing concerns at least the kind of article of clothing (shirt, trousers, jacket, etc.) but preferably also the color and/or the pattern (striped, plain, etc.) and is contained, for example, in a label T (FIG. 1) attached to the article of clothing.

The authentication of the user is important not only to recognize this user in another trying-on room, but also because it is not desired that pictures can be taken without the agreement of the user.

Then, the system takes a picture (block 23, PICTURE), with camera 3 and stores that picture (block 24, STORE) with the identification of the user. The storage of the picture can be temporarily made in the control device 6 of the changing room which comprises a memory before transmission to the central system 10 for storing in the database 13.

Alternatively, the picture can be sent to the user's home, for example, through the Internet, to allow the user seeing the picture on its own computer.

Several pictures of the user swearing several clothes can be made in a same changing room before the user goes out to another shop. However, for simplicity, the invention will be described in case only one article of clothing is tried on in the first changing room.

When the user comes into another shop (or in the same shop, but after having wore another article of clothing), he may want comparing or matching the current article of clothing with a previous one. For example, supposing that the user U wears trousers having vertical stripes as shows in the lower room of FIG. 1 (block 25, CLOTHES2), he may want comparing the trousers with vertical stripes to the trousers with horizontal ones.

According to the invention, the user must then identity himself either with a keyboard or any entering device of the changing room or by introducing his authentication card in the reader 7. Further, the current article of clothing worn by the user has to be identified by the system (block 26, IDENTIFY USER/CLOTHES). As previously, the system identifies the article of clothing (kind, color, and pattern) by detecting its label T.

The user then selects (block 27, COMPARE/MATCH) if he wants to compare the current article of clothing he wears to a previous one of the same kind, or it he wants to match the current article of clothing with another kind of article of clothing tried in a previous changing room. Such a selection can be done with a selection device (for example a two-buttons keyboard 9), which may be combined with the identification device 7, to indicate to the system 10 which kind of picture is desired. The central system 10 then searches the corresponding pictures (block 28, SEARCH). The selected pictures are transmitted to the control device 6 of the current room and the pictures are displayed (block 29, DISPLAY) on the screen 4. If there is more than one picture to display, one can either provide a scrolling display with a predetermined timing for each picture, or share the screen into several areas in which the different pictures are displayed.

To match the different types and/or colors and/or patterns of clothes, the central system 10 (alternatively the control device 6 of the current room) contains dressing rules. Such rules may be lists of clothes to be worn together, color matching or any rules which can be translated to be interpreted by a computerized system.

The current article of clothing worn by the user is also to be stored in the central system for a next comparison. Therefore, the camera 3 of the trying-on room also takes a picture (block 23') and transmits this picture to the central system to be stored (block 24').

An advantage of the present invention is that a shopper can not only see himself normally in a mirror with clothes on, but also view a picture of himself with other clothes on.

Another advantage of the present invention is that, with the automatic detection of the clothes worn by the user, the system is then able to automatically select the kind of pictures to be displayed.

The central system 10 of the invention or the control devices 6 of each trying-on room are accordingly able to select clothes depending on their type. For example, a list of clothes of same kind is stored in the central system 10 or in the control devices 6. Further, according to the preferred embodiment of the present invention in which the user can also match clothes of different kinds, the system also comprises lists or tables with the kinds of clothes which can be matched (for example, trousers with a jacket). Of course, if the pictures available for the user only contain one kind of clothes, the system does preferably not wait for a selection between matching and comparison, and (considers a comparison mode.

A further advantage, of the present invention is that, having stored different pictures of the user, these pictures can also be displayed on the own computer of the user (for example, transmitted through Internet).

Having thus described at least one illustrative embodiment of the invention, various alterations, modifications and improvements will readily occur to those skilled in the art. In particular, implementing the invention with computerized devices in the ability of one with an ordinary skill in the art. Further, other elements having the same function thus described in the present specification can be provided in replacement. For example, the screen 4 and the mirror 2 can be combined, or more than one screen may be associated with a single mirror. With this respect, the size of the mirror and of the screen may be the same or different.

Furthermore, other detection devices may be provided either for identifying the user or for detecting the kind of the clothes. It should also be noted that a single picture can be taken with a user wearing more than on a article of clothing. Then, the matching is preferably invalidated for the next changing room. Finally, the present invention may also apply to other wearing articles than clothes. For example, shoes, hats, glasses, etc.

Such alterations, modifications, and improvements are intended to be within the spirit and scope of the invention. Accordingly, the foregoing description is by way of example only and is not intended to be limiting. This invention is limited only as defined in the following claims and the equivalents thereto.

The invention claimed is:

1. A system for reproducing a preceding picture of a user wearing clothes or other articles, comprising:
   input means to receive at least one pre-registered picture of a user actually wearing at least one previous article of clothing;
   a storage element to store the at least one pre-registered picture along with an identification of a kind of the at least one previous article previously actually worn by the user as shown in the at least one pre-registered picture;
   a screen to display the at least one pre-registered picture of the user;
   a clothes type detector to automatically identify the kind of articles currently worn by the user;
   a selecting tool for the user to select between a first and a second type of search to perform upon a plurality of pre-registered pictures of the user stored in at least one central database, the first and second type of searches being based upon (1) a stored identification of a kind of article actually being worn by the user as shown in each of the plurality of pre-registered pictures and (2) a current identification of a kind of article of a current article actually worn by the user,
   and (a) the first type of search facilitates a comparison of the current article actually worn by the user with at least one first article previously actually being worn by the user as shown in a first one of the plurality of pre-registered pictures, the current article and the at least one first article being of a same kind of article of clothing, and (b) the second type of search facilitates a matching of the current article actually worn by the user with at least one second article previously actually being worn by the user as shown in a second one of the plurality of pre-registered pictures, the current article and the at least one second article being of a different kind of article of clothing; and
   a search unit to extract automatically, from the at least one central database and in accordance with first or second type of search selected, the at least one pre-registered picture in which the user is previously actually wearing the at least one previous article similar to or capable of being matched with the current article actually worn by the user.

2. The system of claim 1, further comprising a mirror for reproducing the current appearance of the user for comparison with at least one previous appearance of the user, the previous appearance being associated with a previous location different from a current location of the user.

3. The system of claim 1, further comprising:
   a camera to take a picture of the user actually wearing articles.

4. The system of claim 1, comprising a card read for identifying the user to be used in combination with a selection device for selecting pictures of the user actually wearing different types of articles at a previous location based upon article type.

5. The system according to claim 1, wherein the central database comprises a table with dressing rules, the dressing rules include rules associated with pattern matching.

6. The system of claim 1, also comprising a link to a central remote system permitting remote searching of said central database over a communications network.

7. The system of claim 1, further comprising a trying-on room.

8. A method of reproducing a preceding picture of a user wearing clothes or other articles, the method comprising:
   identifying a person at a first location;
   acquiring images of the person at the first location showing articles as previously actually worn on the person;
   storing each of the images along with (1) the identification of the person and (2) an identification of at least one first kind of article previously actually worn on the person as shown in a respective one of the images in a database accessible from a second location;
   identifying the person at a second location;
   determining a second kind of a second article currently worn by the identified person at the second location;
   selecting between a comparison type of search and a match type of search to perform on the images at the second location;
   searching the database based upon the type of search selected such that
      (a) if the comparison type of search is selected, then images are retrieved from the database in which the at least one first kind of article previously actually worn on the person shown is of a same kind as the second kind of the second article currently worn, and
      (b) if the match type of search is selected, then images are retrieved from the database in which the at least one first kind of article previously actually worn on the person shown is of a different kind than the second kind of the second article currently worn; and
   displaying images retrieved from the database based upon the type of search selected on a display located at the second location.

9. The method of claim 8, the method comprising using dressing rules during the match type of search to facilitate identifying different kinds of articles that may be worn together.

10. The method of claim 8, the method comprising transmitting the images showing the articles as previously actually worn by the person to a personal computing device.

11. The method of claim 8, the method comprising acquiring a plurality of images of the first person at the first location showing the person wearing various combinations of articles of merchandise for sale from the first location.

12. The method of claim 8, the method comprising:
displaying each of the images identified by the type of search selected on the display at the second location by scrolling through each of the images identified by the type of search selected.

13. The method of claim 8, the method comprising:
displaying more than one of the images identified by the type of search selected on the display at the second location simultaneously.

\* \* \* \* \*

UNITED STATES PATENT AND TRADEMARK OFFICE
CERTIFICATE OF CORRECTION

PATENT NO.       : 7,356,489 B2
APPLICATION NO.  : 10/457949
DATED            : April 8, 2008
INVENTOR(S)      : Martin Illsley et al.

It is certified that error appears in the above-identified patent and that said Letters Patent is hereby corrected as shown below:

In column 1, line 18, under "BACKGROUND", delete "chancing" and substitute --changing-- in its place.

In column 1, line 56, under "BRIEF SUMMARY OF INVENTION", immediately after "pre-registered picture" insert --;-- (semicolon).

In column 2, line 33, under "DESCRIPTION OF THE DRAWINGS", after "have been" delete "shove" and substitute --shown-- in its place.

In column 2, line 49, under "DESCRIPTION OF THE PREFERRED EMBODIMENTS", immediately after "in the mirror" delete ":" (colon).

In column 2, line 55, under "DESCRIPTION OF THE PREFERRED EMBODIMENTS", after "to display" delete "picture s)" and substitute --picture(s)-- in its place.

In column 3, line 18, immediately after "communicates with a" delete "," (comma).

In column 3, line 21, after "different changing" delete "roams" and substitute --rooms-- in its place.

In column 3, line 33, immediately after "stripes" insert --.-- (period).

In column 4, line 4, after "of the user" delete "swearing" and substitute --wearing-- in its place.

In column 4, line 13, after "stripes as" delete "shows" and substitute --shown-- in its place.

In column 4, line 27, after "same kind, or" delete "it" and substitute --if-- in its place.

In column 5, line 4, after "comparison, and" delete "(considers" and substitute --considers-- in its place.

In column 5, line 6, immediately after "further advantage" delete "," (comma).

UNITED STATES PATENT AND TRADEMARK OFFICE
CERTIFICATE OF CORRECTION

PATENT NO. : 7,356,489 B2
APPLICATION NO. : 10/457949
DATED : April 8, 2008
INVENTOR(S) : Martin Illsley et al.

It is certified that error appears in the above-identified patent and that said Letters Patent is hereby corrected as shown below:

In the Specification (cont'd)

In column 5, line 24, after "more than" delete "on a" and substitute --one-- in its place.

Signed and Sealed this

Sixteenth Day of September, 2008

JON W. DUDAS
*Director of the United States Patent and Trademark Office*